US006946754B2

(12) United States Patent
Inagaki et al.

(10) Patent No.: US 6,946,754 B2
(45) Date of Patent: Sep. 20, 2005

(54) LINEAR MOTOR AND LINEAR COMPRESSOR

(75) Inventors: Ko Inagaki, Kanagawa (JP); Ichiro Morita, Kanagawa (JP)

(73) Assignee: Matsushita Refrigeration Company, Shiga (JP)

(*) Notice: Subject to any disclaimer, the term of this patent is extended or adjusted under 35 U.S.C. 154(b) by 100 days.

(21) Appl. No.: 10/348,539

(22) Filed: Jan. 21, 2003

(65) Prior Publication Data

US 2003/0173836 A1 Sep. 18, 2003

(30) Foreign Application Priority Data

Feb. 14, 2002 (JP) ...................................... 2002-036513

(51) Int. Cl.$^{7}$ ......................... H02K 41/00; H02K 33/00
(52) U.S. Cl. ........................................... 310/12; 310/23
(58) Field of Search ............................. 310/12, 23, 30, 310/34; 417/417

(56) References Cited

U.S. PATENT DOCUMENTS 4,404,503 A * 9/1983 Ward et al. ................. 318/119
4,835,424 A * 5/1989 Hoffman et al. .............. 310/12
5,315,190 A * 5/1994 Nasar .......................... 310/12
5,751,075 A * 5/1998 Kwon et al. .................. 310/12
5,844,332 A * 12/1998 Lee ............................ 310/12
6,268,643 B1 * 7/2001 Russell
6,317,370 B2 * 11/2001 Shirley
6,345,666 B1 * 2/2002 Conrad ....................... 165/154
6,541,849 B1 * 4/2003 Roohparvar
6,573,624 B2 * 6/2003 Park ............................ 310/12
6,736,614 B1 * 5/2004 Bahnen et al. .............. 417/417

FOREIGN PATENT DOCUMENTS

GB 2 241 287 A * 8/1991 ........... F04B/17/04
JP 9-172764 6/1997
JP 2001-090660 A * 4/2001 ........... F04B/35/04

* cited by examiner

*Primary Examiner*—Darren Schuberg
*Assistant Examiner*—Judson H. Jones
(74) *Attorney, Agent, or Firm*—RatnerPrestia

(57) ABSTRACT

A linear motor includes a stator including a stator core for forming plural magnetic poles and a magnetic wire mounted on the stator core, and a mover provided at the interior of the stator and including a mover core and a magnet mounted on the outer side of the mover core. The linear motor has the magnet have a reduced mass, thus having a small size, a low overall cost, and a high operating efficiency.

40 Claims, 9 Drawing Sheets

LINEAR MOTOR AND LINEAR COMPRESSOR

FIELD OF THE INVENTION

The present invention relates to a linear motor and a linear compressor including the linear motor for use in a refrigerating cycle system.

BACKGROUND OF THE INVENTION

Refrigerating apparatuses are recently demanded to have a high operating efficiency. A compressor driven by a linear motor, having a substantially simple mechanical structure, has been utilized widely for improving the operating efficiency since the compressor is expected to significantly decrease loss in its sliding movement.

FIG. 10 is a cross sectional view of a conventional linear motor disclosed in Japanese Patent Laid-open No. 9-172764. A second silicon steel sheet layer 3 of a hollow cylindrical shape having a coil 2 is provided by a gap on the outer side of a first silicon steel sheet layer 1 of a hollow cylindrical shape. Plural magnets 5 are bonded and fitted into grooves provided in the outer side of a nonmagnetic shell 4 of a hollow cylindrical shape. The shell is located between the first silicon steel sheet layer 1 and the second silicon steel sheet layer 2 and is joined to a piston (not shown), thus forming a magnetic assembly 6. A movable section of the motor including the magnet assembly 6 is arranged for reciprocate movement along the axial direction D1 of the first silicon steel layer 1 and the second silicon steel layer 2.

The magnets 5 are made of rare-metal ferromagnetic material for generating a high intensity of magnetic field for allowing the motor to have an operating efficiency. The magnets are magnetized vertical to the direction of the reciprocate movement.

An operation of the conventional linear motor will be explained.

The coil 2, upon being energized with a current, generates a magnetic flux loop through the first silicon steel sheet layer 1, a gap, the magnet 5, a gap, the second silicon steel sheet layer 3, a gap, the magnet 5, a gap, and the first silicon steel sheet layer 1, hence forming a magnetic circuit. The magnetic flux causes the magnets 5 to be attracted by magnetic poles developed on the second silicon steel sheet layer 3. Then, as the current to the coil 2 is alternated, the magnetic assembly 6 carries out a reciprocate motion between the first silicon steel sheet layer 1 and the second silicon steel sheet layer 3 along the direction D1 in FIG. 10.

The conventional linear motor includes the magnetic assembly 6 to reciprocate between the first silicon steel sheet layer 1 and the second silicon steel sheet layer 3, and thus needs the gaps among the magnetic assembly 6, the first silicon steel sheet layer 1, and the second silicon steel sheet layer 3. This arrangement has the magnetic flux loop developed on the first silicon steel sheet layer 1 and the second silicon steel sheet layer 3 for driving the magnetic assembly 6 flow across the gaps.

The gaps of the magnetic assembly 6 from the first silicon steel sheet layer 1 and the second silicon steel sheet layer 3 are designed to be a desired distance for preventing them from any direct contact. The gaps, however, act as magnetic resistances, thus decreasing the intensity of the magnetic flux in proportion to the distance. This increases a current to the coil 2 in order to offset the decreasing of the intensity of the magnetic flux, which results from the gaps, and makes the motor need a sufficient power for driving the magnetic assembly 6. As the result, the conventional linear motor consumes more energy, and thus, it is difficult to increase the operating efficiency of the motor.

The conventional motor requires greater sizes of magnets 5 in order to generate a necessary power for driving the magnetic assembly 6. The greater size of the magnets 5 made of rare-metal material, being expensive, increases the overall cost of the motor.

The gap between the magnetic assembly 6 and the first silicon steel sheet layer 1 and the gap between the magnetic assembly 6 and the second silicon steel sheet layer 3 are preferably identical in their distances. If the gaps are not equal in the distances, the magnetic attraction between the magnets 5 and the first silicon steel sheet layer 1 may be different from that between the magnets 5 and the second silicon steel sheet layer 3. This creates a pinching stress perpendicular to the movement of the magnetic assembly 6. The stress causes a supporting mechanism, such as a bearing, to produce a loss in sliding movement and an abnormal worn-out, thus shortening its life time.

For avoiding the above problem, the distances of the gaps may be increased to relatively reduce the difference between them. This, however, requires a further increase in a current input and increase the size of the magnets 5. Thus, improving the dimensional accuracy of a driving system including the magnet shell is commonly considered. For improving the dimensional accuracy, the magnet shell 4 as a moving component has to have an increased thickness, thus increasing the overall weight of the driving system. This makes a force for driving the magnet assembly 6 increase, and thus, increases the current input to the coil 2. Moreover, as the dimensional accuracy of the driving system is increased, its overall production cost is raised.

SUMMARY OF THE INVENTION

A linear motor includes a hollow stator including a stator having plural magnetic poles at an inner side thereof and a wire mounted on the stator core for forming the magnetic poles, and a mover located at an interior of the stator and being capable of oscillating against the stator. The mover includes a mover core and a magnet mounted to an outer side of the mover and face the magnetic poles by a gap.

The linear motor has a reduced mass of magnetic materials, thus having a reduced cost and increased operating efficiency.

DESCRIPTION OF THE PREFERRED EMBODIMENTS (Exemplary Embodiment 1)

Figure 1:
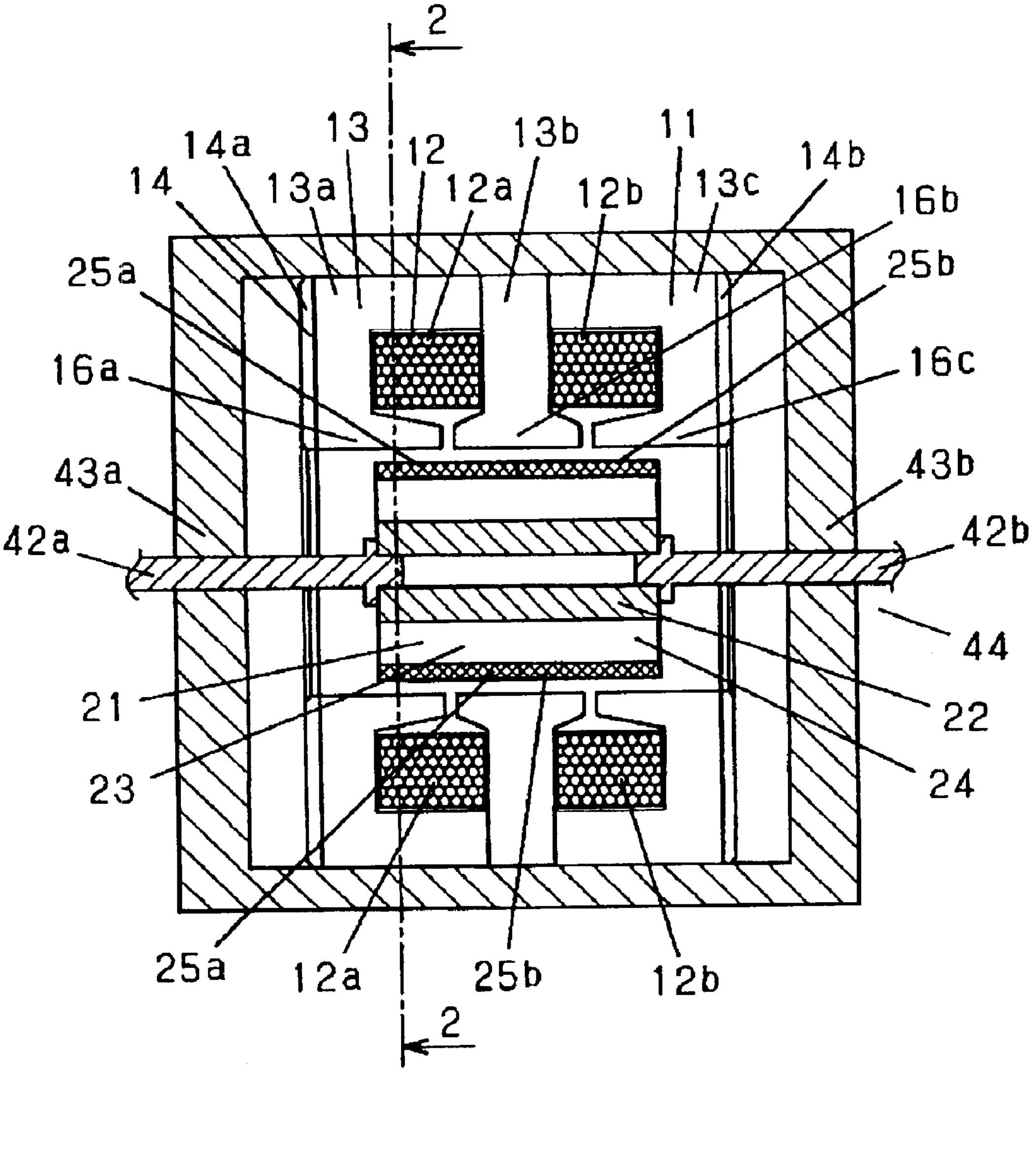
FIG. 1 is a cross sectional view of a linear motor according to exemplary embodiment 1 of the present invention.
Figure 2:
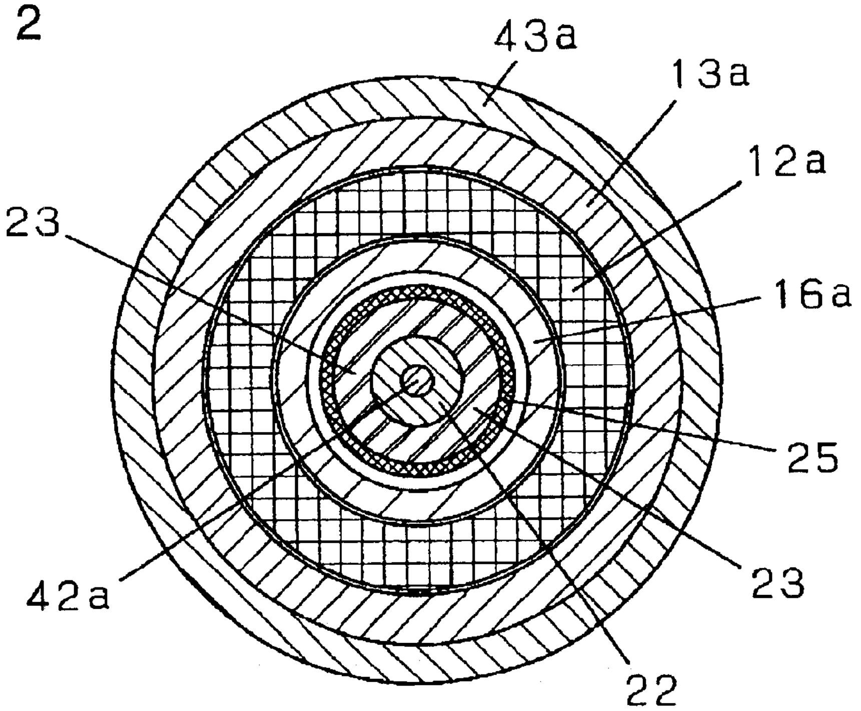
FIG. 2 is a cross sectional view of the linear motor taken at a line 2—2 of FIG. 1.
Figure 3:
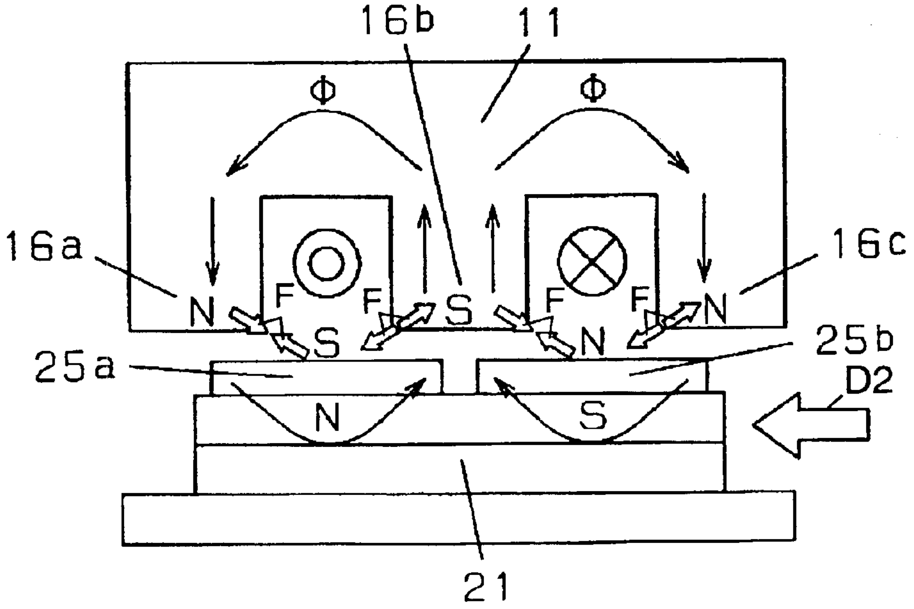
FIG. 3 is a schematic view showing an operational principle of the linear motor according to embodiment 1.
Figure 4:
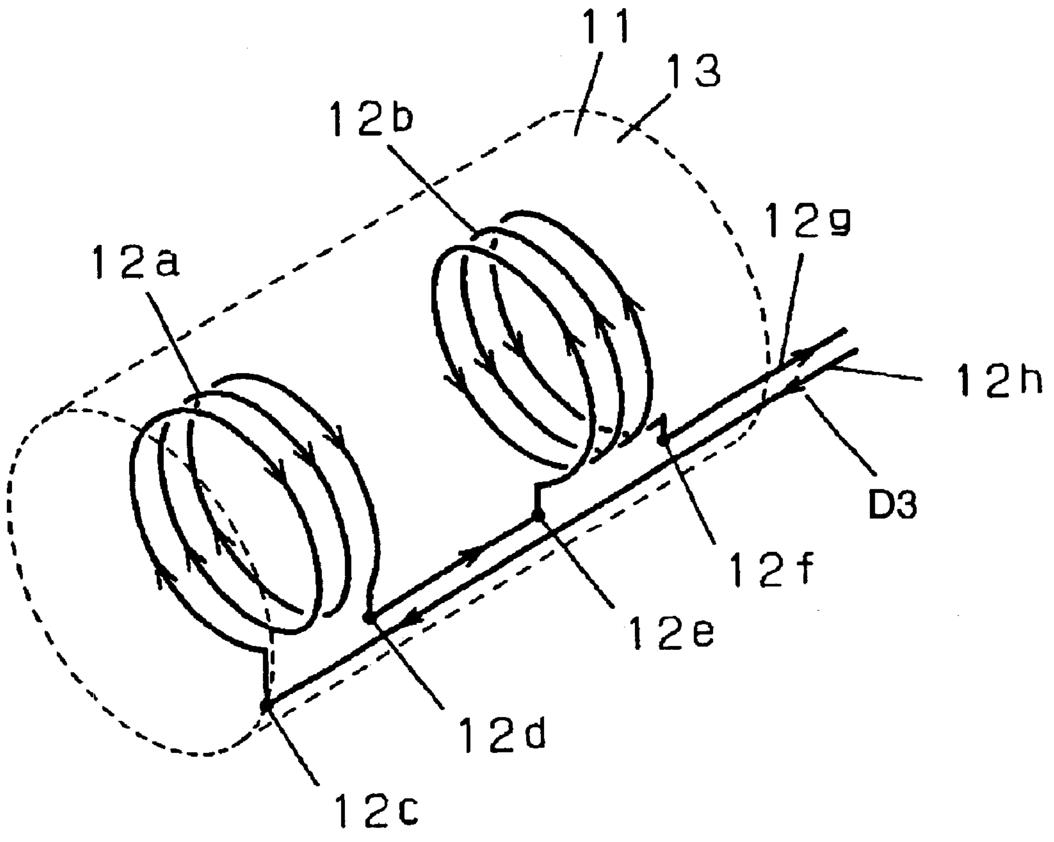
FIG. 4 illustrates currents flowing in the linear motor according to embodiment 1.

FIG. 1 is a cross sectional side view of a linear motor according to exemplary embodiment 1 of the present invention. FIG. 2 is a cross sectional view of the linear motor at a line 2—2 of FIG. 1. FIG. 3 is a schematic view illustrating an operational principle of the linear motor. FIG. 4 is a schematic view illustrating electric currents flowing in the linear motor.

In this description, the linear motor employs, for example, a magnet wire as a wire for generating a magnetic force.

A stator 11 of the linear motor has a substantially cylindrical shape and includes two magnetic wires 12 wound like rings and a stator core 13. The core has three magnetic poles developed separately on its inner side and is configured to have the magnetic wires 12 accommodated therein.

The stator core 13 is made of sheets of silicon steel, such as JIS C2352 non-directionally electromagnetic steel. The sheets are magnetically non-directional, have high magnetic permeability, and extends radially about the axis of the substantially cylindrical stator 11. More particularly, the stator core 13 includes stator portions 13*a*, 13*b*, and 13*c* aligned along the axial direction. The stator core portions 13*a*, 13*b*, and 13*c* have magnetic poles 16*a*, 16*b*, and 16*c*, respectively, on their respective inner sides, and are positioned to hold the two magnetic wires 12*a* and 12*b* between them.

End plates 14 made of stainless steel material, which is non-magnetic and has a high electrical resistance than iron, hold the stator core portions 13*a* and 13*c* from both ends, thus holding the silicon steel sheets, arranged radially.

The magnetic wires 12*a* and 12*b* have nodes 12*c*, 12*d*, 12*e*, and 12*f*, as shown in FIG. 4, which are connected so that currents in the wires 12*a* and 12*b* flow in respective directions opposite to each other around the axis as shown in FIG. 3 at a gap provided in a part of the radially-arranged sheets of the stator core 13. The nodes 12*g* and 12*h* of the magnetic wires 12*a* and 12*b* are drawn out with electrically insulating leads from the stator core 13.

A mover 21 having a substantially cylindrical shape is coaxial with the stator 11 and is accommodated in the internal space of the stator 11, being axially movable. The mover 21 includes a mover core 24 and a magnet 25. The mover core 24 includes a hollow core portion 22 made of ferrous material and a sheet-containing portion 23 made of sheets of silicon steel, such as JIS C2352 non-directionally electromagnetic steel, which have a high magnetic permeability and extend radially and outwardly from the core portion 22. The magnet 25 includes two magnets 25*a* and 25*b* aligned along the axis and bonded with an adhesive on the outer side of the mover core 24 so as to be spaced by a distance from the inner side of the stator 11. Magnetic poles of the magnets 25*a* and 25*b* have polarities opposite to each other. The magnet 25 includes rare earth element, thus having ferromagnetic properties.

A frame 43 movably supports a shaft 42 joined with the core portion 22 extending along the direction of the movement and supports the outer side of the stator 11. The shaft 42 and the frame 43 serve as a support mechanism 44. Shafts 42*a* and 42*b* and bearings 43*a* and 43*b* are made of stainless steel material which is non-magnetic and has a significantly high electric resistance than iron.

While the movement of the mover 21, the magnet 25*a* faces the magnetic poles 16*a* and 16*b*, and the magnet 25*b* faces the magnetic poles 16*b* and 16*c*.

The mover 21 has a length not to project out of the internal space of the stator 11. A difference of respective lengths between the stator 11 and the mover 21 is substantially equal to the maximum of the movement or the stroke of the mover 21.

An operation of the linear motor according to embodiment 1 will be explained.

Upon flowing in the magnetic wires 12*a* and 12*b* in a direction D3, as shown in FIG. 4, a current generates a loop of magnetic flux Φ flowing through the stator core, a gap, the magnets, the mover core, and the magnet, as shown in FIG. 3. The magnetic flux Φ then magnetizes the magnetic poles 16*a*, 16*b*, and 16*c* of the stator core as N, S, and N, respectively. The magnets 25*a* and 25*b* of the mover 21 are magnetized as S and N, respectively, thus creating attraction and repulsion forces F for driving the mover 21 in a direction D2.

When the current in the magnetic wires 12*a* and 12*b* flows in a reverse direction, the mover 21 is driven in a direction reverse to the direction D2. The mover 21 hence moves forward and backward by alternating the direction of the current.

The magnets 25*a* and 25*b* are fixedly mounted on the outer side of the mover core 24, thus creating a smaller gap in the magnetic flux than a conventional linear motor, since the motor of the embodiment does not include a gap between the magnet and the mover core. This decreases the magnetic resistance and allows the magnetic flux to propagate more fluent than that of the conventional linear motor. The current supplied to the magnetic wires for generating the magnetic flux accordingly decreases, thus improving the operating efficiency and reducing the magnetism of the magnets.

Since the mover core and the stator core include steel sheets extending radially from the axis, a direction in which the steel sheets extends is identical to the direction of the magnetic flux. This arrangement increases the magnetic permeability and reduces a current induced in the cores, thus reducing the operational loss.

According to embodiment 1, the magnets, since being bonded on the mover core with the adhesive to be integral with the mover, is reinforced despite of its low physical strength as original. This arrangement allows the magnets made of costly rare metal material to be thin as much as possible, hence significantly contributing to cost down and improving the operational efficiency through reducing its overall weight.

Since having cylindrical shapes, the mover and the stator can be appropriately positioned by simply aligning their axes with each other. For example, the linear motor according to embodiment 1 may be assembled to have the uniform gaps more easily than a conventional motor having a mover with a flat outer side. Accordingly, the magnetic attraction of the magnets introduced between the mover and the stator is hardly biased, hence eliminating undesired radial stresses. This prevents a mechanical portion of the stator, such as bearings for holding the mover, from physical injury due to the radial stresses as well as from accidental collision with the mover.

Moreover, since the mover and the stator have the cylindrical shapes, the mover remains spaced by a desired distance from the stator even while rotating. This arrangement allows the support mechanism to be implemented by a simpler arrangement, such as a round shaft and bearings.

The shaft for supporting the mover and the end plates of the stator are made of non-magnetic stainless steel material.

This prevents the magnetic flux from leaking in the shaft through the stator core and the end plates, and thus avoids a current induced by the leaking flux, hence reducing declination of the operating efficiency. These components may be made of other non-magnetic material, such as synthetic plastics, provides the motor with the same effects. The stator, upon positioned based on the end plates as a reference, can ensure dimensional accuracy and are assembled easily, thus having an improved structural strength.

The stator core is separated into stator core portions 13*a*, 13*b*, and 13*c* creating interior spaces for accommodating the magnetic wires. This arrangement allows the stator core portions 13*a*, 13*b*, and 13*c* to be readily assembled through joining alternately with the magnetic wires 12*a* and 12*b*, thus increasing its production efficiency.

The stator according to embodiment 1 includes three of the magnetic poles while the mover includes two of the magnets aligned axially. The stator may have more than three magnetic poles. In this case, the number of the axially aligned magnets of the mover is smaller by one than the number of the magnetic poles for providing the same effect as of embodiment 1.

The mover includes the steel sheets having identical widths arranged radially from the core portion to form the cylindrical shape easily. The mover, upon being assembled on the basis of the core portion, can be formed easily. A sheet portion including the sheets, upon having a large diameter at its inner side, allows the distance between any two adjacent steel sheets to be small at the outer side. This arrangement accordingly increases the cross section of the steel sheets, and the magnetic path is increased, hence reducing the magnetic resistance in the magnetic flux loop. As the result, the current required for generating a given intensity of the magnetism can be small, thus improving the operating efficiency of the linear motor.

Since being made of ferrous material, the core portion of the mover functions as a magnetic path in the magnetic flux loop. Accordingly, the mover has a reduced weight, thus increasing the operating efficiency.

Since the core portion contributes little to the physical strength of the overall construction and the magnetism of the magnetic loop, the portion can be hollow, thus reduces the weight of the mover.

The directions of the magnetic flux $\Phi$ in the stator core portions 13*a* and 13*c* are different by 90°. However, the stator core portions are made of electromagnetically-non-directional steel material which is not directional in magnetic permeability, and thus hardly affect the magnetism of the magnetic flux in any direction.

The maximum of the linear movement or the stroke of the mover is substantially equal to a difference between respective lengths of the mover 21 and the stator 11. This arrangement eliminates declination in the power of the motor caused by the mover projecting out of the stator and receiving a counter magnetic force for returning the mover back to the inside.

The linear motor according to embodiment 1 may be utilized as a power generator for converting the reciprocate movement to an electricity.

The leads from the magnetic wires are connected in series according to the embodiment, and may be connected in parallel.

(Exemplary Embodiment 2)

Figure 5:
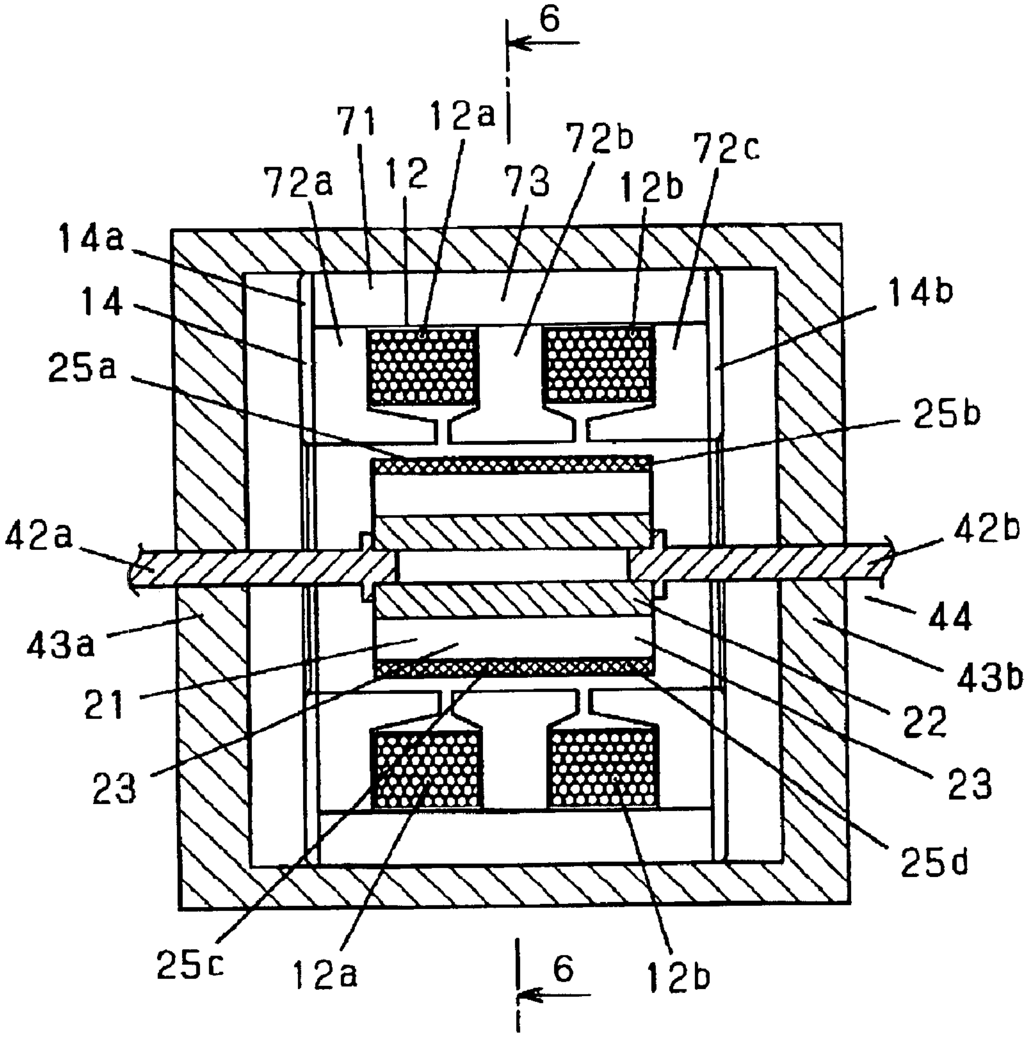
FIG. 5 is a cross sectional view of a linear motor according to exemplary embodiment 2 of the invention.

FIG. 5 is a cross sectional view of a linear motor according to exemplary embodiment 2 of the present invention.

Figure 6:
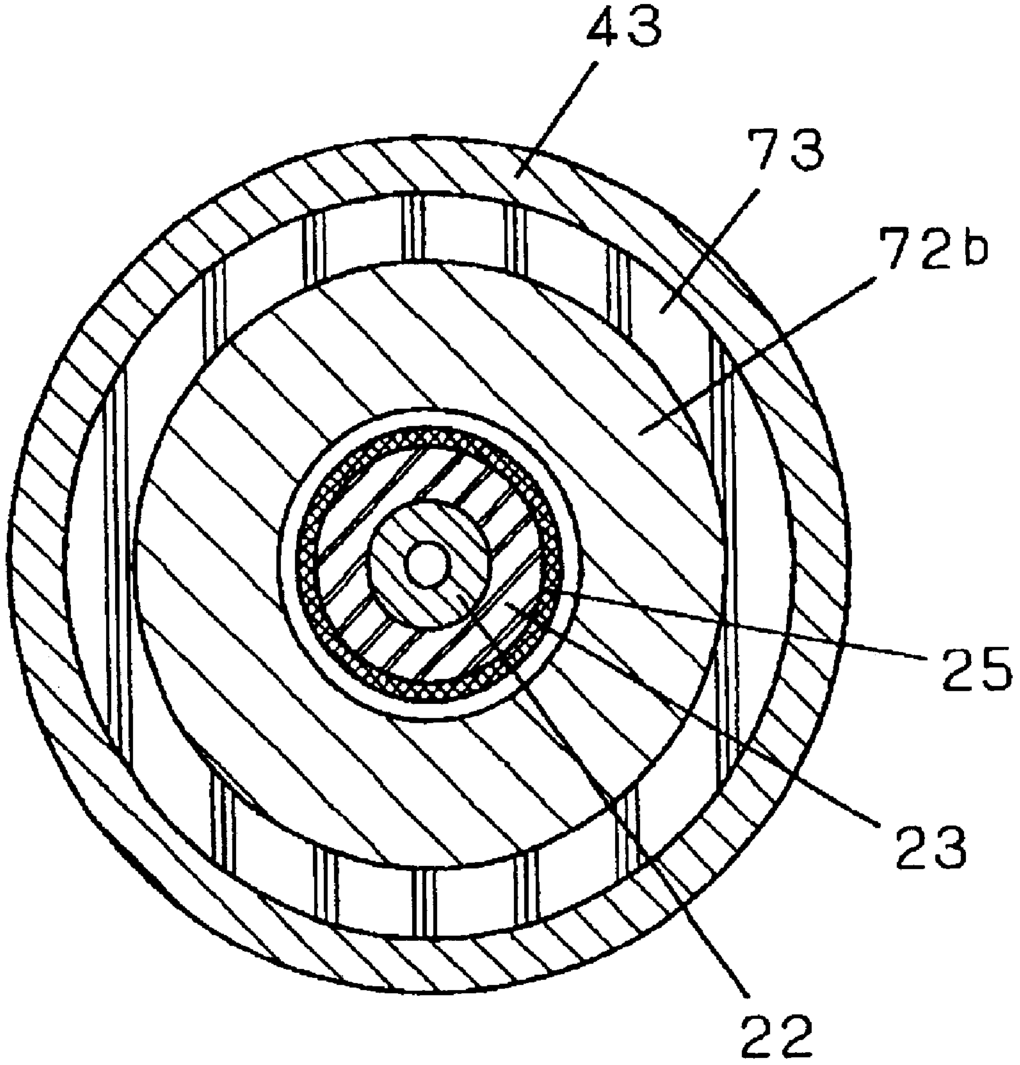
FIG. 6 is a cross sectional view of the linear motor at a line 6—6 of FIG. 5.
Figure 7:
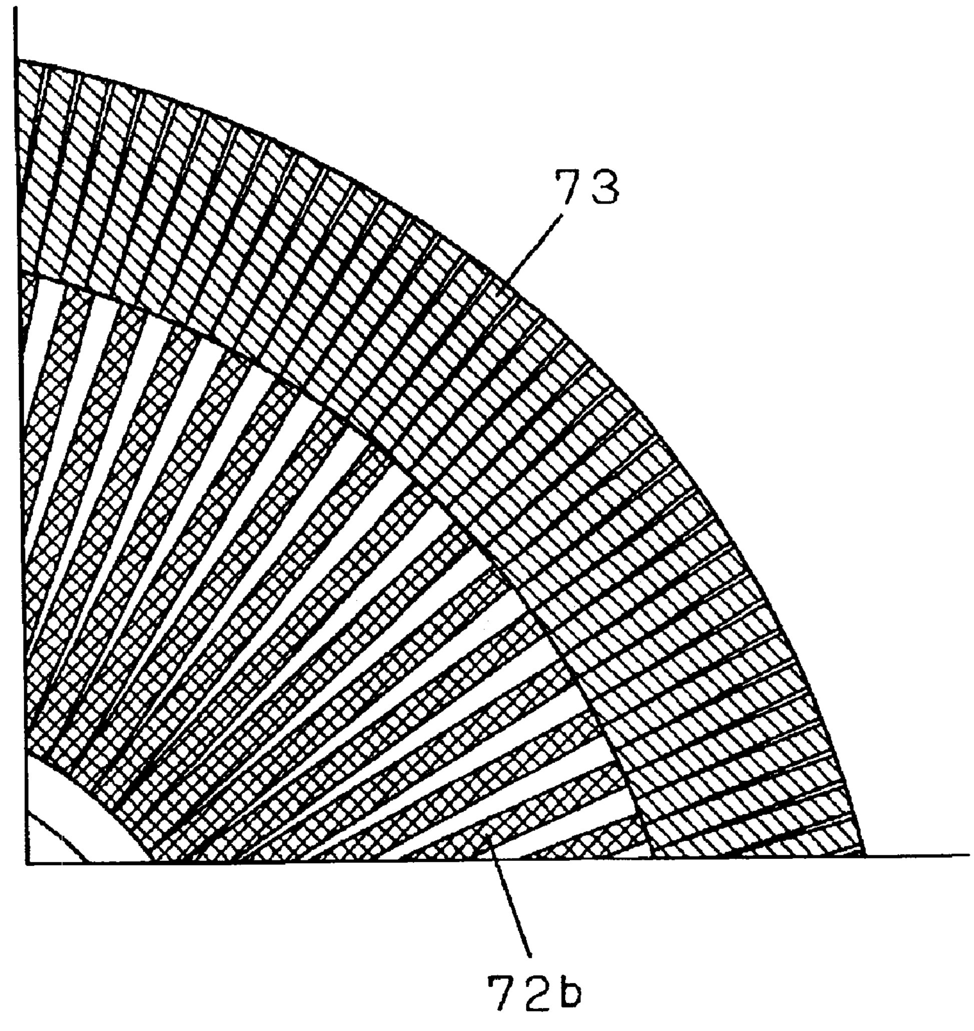
FIG. 7 is a cross sectional view of a primary part of the linear motor according to embodiment 2.
Figure 8:
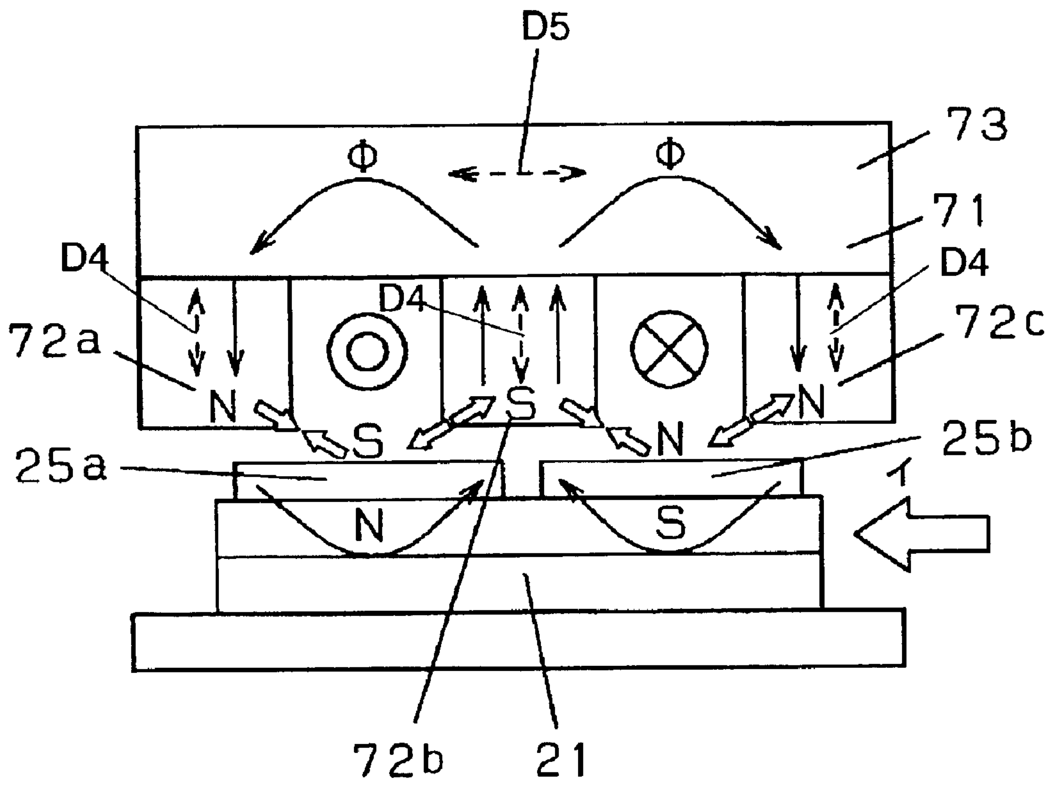
FIG. 8 is a schematic view showing an operational principle of the linear motor according to embodiment 2.

FIG. 6 is a cross sectional view of the liner motor at a line 6—6 of FIG. 5. FIG. 7 is an enlarged view of a primary part of the linear motor. FIG. 8 is a schematic view showing an operational principle of the linear motor.

A stator 71 of the linear motor includes two magnetic wires 12 previously would like rings, a stator core 72, an outer stator core portion 73, and end plates 14, and is disposed at the outside of a mover 12.

Both the outer stator core portion 73 and the stator core 72 consisting of three portions 72*a*, 72*b*, and 72*c* are made of sheets of silicon steel, such as JIS C2353 directionally electromagnetic steel, which are directional and have high magnetic permeability, and are arranged to extend radially about their axis.

The magnetic wire 12*a* is accommodated between the stator core portions 72*a* and 72*b*, while the magnetic wire 12*b* is accommodated between the stator core portions 72*b* and 72*c*. The outer stator core portion 73 is provided directly on the outer sides of the stator core portions 72*a*, 72*b*, and 72*c* for joining the portions 72*a*, 72*b*, and 72*c* together at their outer sides.

In particular, the portions 72*a*, 72*b*, and 72*c* of the stator core 72 are magnetically oriented in a radial direction D4, while the outer stator core portion 73 is magnetically oriented in an axial direction D5.

An operation of the linear motor according to embodiment 2 will be explained.

In the stator core having a cylindrical shape, the steel sheets arranged to extend radially keep the distance between any adjacent steel sheets is smaller at the inner side of the core, but larger at the outer side. The distance acts as a magnetic resistance and thus should be smaller for improving an operating efficiency. According to embodiment 2, the stator includes separate groups of the steel sheets radially arranged at the outer side and the inner side. This arrangement decreases the distance between adjacent steel sheets at the outer side and increases the density of the steel sheets, thus having the magnetic flux flow easily and improving the operating efficiency.

Since each stator core portion includes the steel sheets being magnetically directional in a direction identical to the directions D4 and D5 of the magnetic flux, the flow of the magnetic flux is further enhanced, and the operating efficiency is improved.

According to embodiment, the stator core is radially separated into two groups, but may be divided into three or more groups. The distance between adjacent steel sheets accordingly decreases, thus improving the operating efficiency.

(Exemplary Embodiment 3)

Figure 9:
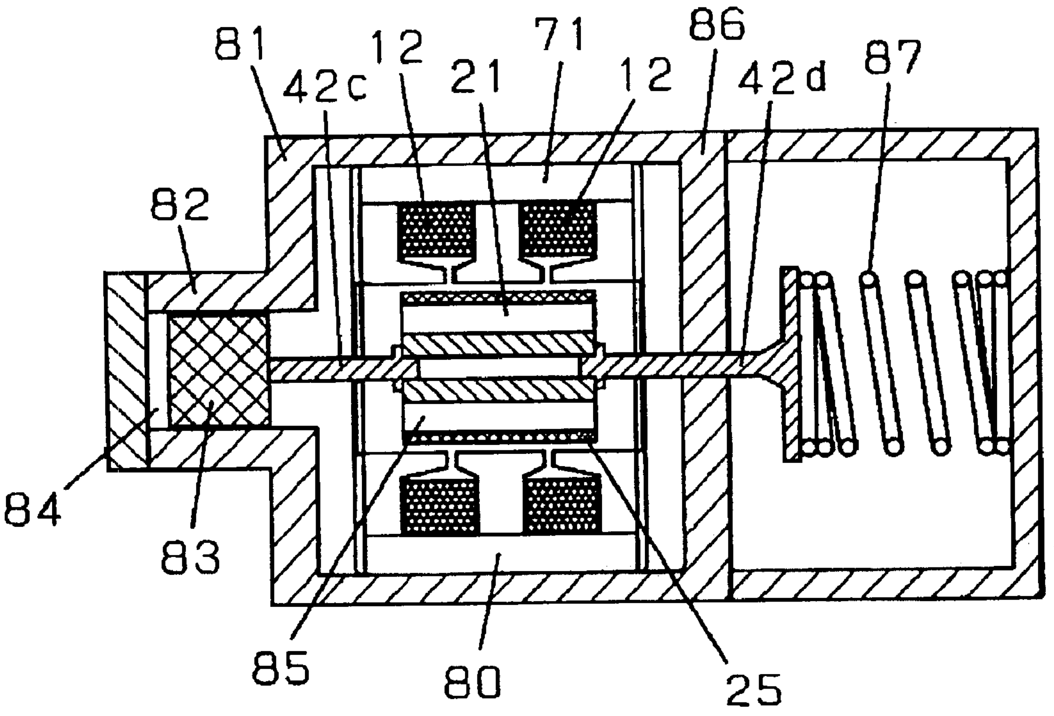
FIG. 9 is a cross sectional view of a linear compressor according to exemplary embodiment 3 of the invention.
Figure 10:
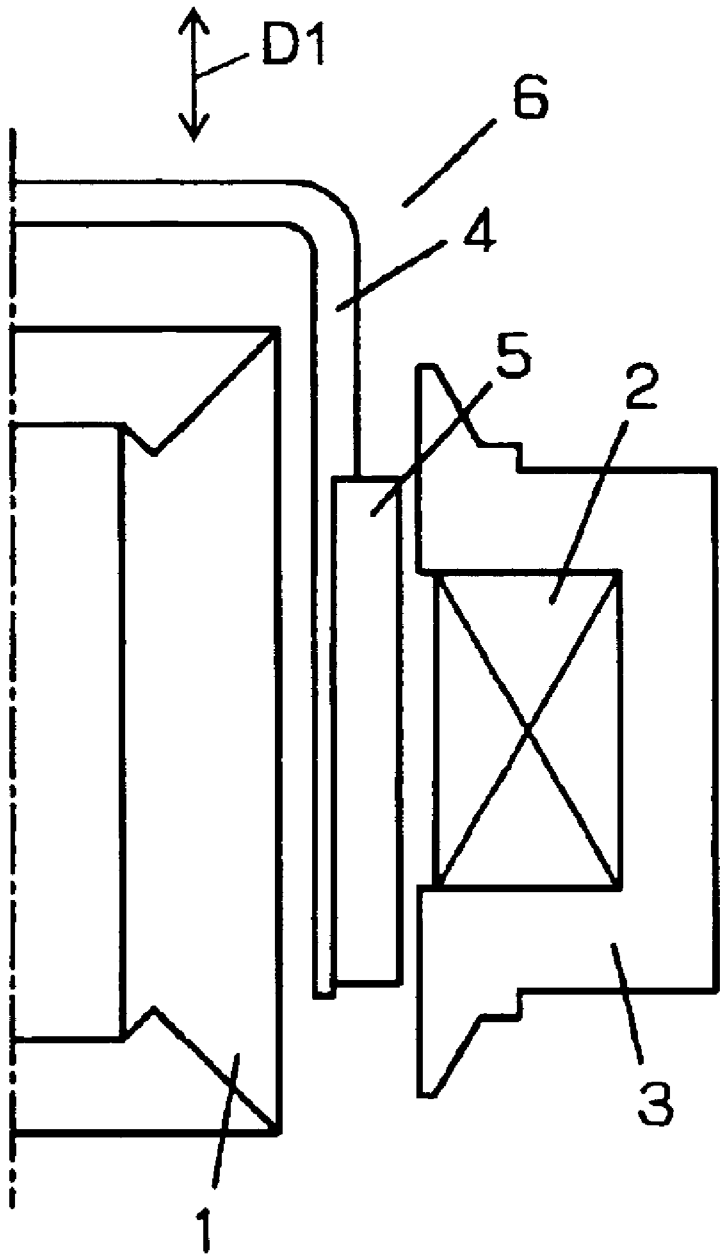
FIG. 10 is a cross sectional view of a conventional linear motor.

FIG. 9 is a cross sectional view of a linear compressor according to exemplary embodiment 3 of the present invention. The linear motor 80 includes a stator 71 and a mover 21. The stator 71 has a substantially cylindrical shape and includes two magnetic wires 12 wound like rings. The mover 21 including a magnet 25 on its outer side has a substantially cylindrical shape being coaxial with the stator 71, and is accommodated in the interior space of the stator 71 for oscillating movement along the common axis. A frame 81 including a cylinder 82 supports a shaft 42*d* and holds the outer side of the stator 71. The cylinder 82 has an interior space coaxial with the linear motor. A cylindrical piston 83 is joined to the distal end of a shaft 42*c* and is accommodated in the cylinder 82 for oscillating movement. The cylinder 82 and the piston 83 configures a compression chamber 84. The mover 80 of the linear motor 80, the shafts 42*c* and 42*d*, and the piston 83 configure a movable section 85. The stator 71 of the linear motor 80, the frame 81, and the cylinder 83 configure a fixed section 86. The movable section 85 is axially movable to the fixed section 86. A resonant spring 87 has one end jointed to the shaft 42*d* of the movable section 85 and the other end jointed to the frame 81 of the fixed section 86. The spring constant of the resonant spring 87 is predetermined so as to allow the spring to have a desired resonant frequency which is defined by the mass of the fixed section 86 and the movable section 85.

An operation of the linear compressor according to embodiment 3 will be explained.

When the magnetic wires 12 are energized with an alternating current, the movable section 85 carries out a reciprocating motion together with the piston 83 joined to the mover 21 against the fixed section 86. This operation introduces refrigerant gas into the compression chamber 84 to compress the gas and delivers the gas to an external refrigerating cycle system.

Since the movable section 85 moves from its neutral position to upper and lower dead points, the resonant spring 87 is biased to apply an acceleration in a reverse direction to the movable section 85. When the movement of the movable section 85 is zero at the upper and lower dead points, the resonant spring 87 stores a maximum energy. As the movable section 85 returns back to the neutral position, the resonant spring 87 is sprung back and transfers the energy to the speed of the movable section 85.

The frequency of the power source is substantially matched with the resonant frequency determined from the mass of the fixed section 86 and the movable section 85 and the spring constant of the resonant spring 87. This arrangement synchronizes a displacement of the movable section 21 in frequency with the acceleration promoted by the resonant spring 87. This operation reduces a loss of the energy, thus allowing the movable section 21 to reciprocate efficiently.

The movable section 21 is joined with the resonant spring 87 to the stator 71. The resonant spring 87 is generally implemented by a coil spring or a leaf spring formed in a spiral shape, which may slightly be twisted when being depressed. The movable section 21 is joined to the cylindrical piston 83 which is rotatably installed in the cylinder 82 for oscillationg movement. The movable section 21 has a cylindrical shape and can thus remain spaced uniformly from the stator 71 even when twisted. This arrangement prevents the linear compressor from any injury caused by collision between the movable section 21 and the stator 71 or from worn-out of its supporting mechanism, such as bearings, caused by an increase in a radial stress which may result from non-uniformity of a gap between the movable section 21 and the stator 71.

What is claimed is:

1. A linear motor comprising:

a hollow stator including:

a stator having a plurality of magnetic poles at an inner side thereof; and a wire mounted on said stator for forming said plurality of magnetic poles; and a mover located at an interior of said stator and being capable of oscillating with respect to said stator, said mover including:

a mover core; and a magnet mounted to an outer side of said mover core and facing said plurality of magnetic poles by a gap of sufficient space to prevent contact between said stator and said mover.

2. The linear motor according to claim 1, wherein said magnetic poles and an outer side of said magnet have substantially cylindrical shapes commonly having an axis along an oscillating direction of said mover.

3. The linear motor according to claim 1, wherein said stator core includes a plurality of first steel sheets arranged to radially extend from an axis along an oscillating direction.

4. The linear motor according to claim 3, said plurality of first steel sheets are made of material not being directional in magnetic field.

5. The linear motor according to claim 3, further comprising an end plate provided at ends of said first steel sheets for holding said first steel sheets.

6. The linear motor according to claim 5, wherein said end plate is made of non-magnetic material.

7. The linear motor according to claim 5, wherein said end plate is made of material having a high electrical resistance.

8. The linear motor according to claim 3, wherein said wire is arranged in a ring shape of which center is said axis, and wherein said stator core further includes a plurality of stator cone portions which sandwich said wire along said oscillating direction, said stator core portions being separated from each other and assembled to provide said stator core.

9. The linear motor according to claim 8, wherein said stator core further includes an outer stator core portion contacting respective outer sides of said stator core portions, said outer stator core portion being separated from said stator core portions and assembled with said stator core portions to provide said stator core.

10. The linear motor according to claim 9, wherein said outer stator core portion includes a plurality of second steel sheets magnetically oriented in said oscillating direction, and wherein each of said stator core portions includes a plurality of third steel sheets magnetically oriented in a direction perpendicular to said oscillating direction.

11. The linear motor according to claim 1, wherein said mover core includes a plurality of steel sheets arranged radially from an axis along an oscillating direction of said over.

12. The linear motor according to claim 1, wherein said mover core includes:

a core portion having a substantially cylindrical shape having an axis along said oscillating direction; an a sheet-containing portion including a plurality of steel sheets arranged radially from said core portion, said sheet-containing portion having said axis of said core portion, said magnet being mounted to outward ends of said steel sheets.

13. The linear motor according to claim 12, wherein said core portion is hollow.

14. The linear motor according to claim 12, wherein said core portion is made of ferrous material.

15. The linear motor according to claim 1, wherein a length of said stator along said oscillating direction is substantially equal to a sum of a maximum stroke of said mover and a length of said mover along said oscillating direction.

16. The linear motor according to claim 1, further comprising a support mechanism for supporting said mover movably along said oscillating direction with respect to said stator.

17. The linear motor according to claim 16, wherein said support mechanism is made of non-magnetic material.

18. The linear motor according to claim 16, wherein said support mechanism is made of material having a high electrical resistance.

19. The linear motor according to claim 1, wherein said magnet includes a portion facing first and second magnetic poles of said plurality of magnetic poles adjacent to each other, and said portion of said magnet has one of an N-pole and an S-pole.

20. The linear motor according to claim 19, wherein said magnet faces said first and second magnetic poles simultaneously during operation.

21. The linear motor according to claim 1, wherein said magnet is mounted on said outer side of said mover core.

22. The linear motor according to claim 3, wherein said plurality of first steel sheets have uniform thicknesses.

23. The linear motor according to claim 10, wherein said plurality of second steel sheets are arranged to radially extend from said axis and have uniform thicknesses.

24. The linear motor according to claim 10, wherein said plurality of third steel sheets are arranged to radially extend from said axis and have uniform thicknesses.

25. The linear motor according to claim 1, wherein said magnet of said mover is operable to face said plurality of magnetic poles simultaneously.

26. A linear compressor comprising:

a linear motor including:

a hollow stator including:

a stator having a plurality of magnetic poles at an inner side thereof; and a wire mounted on said stator for forming said plurality of magnetic poles; and a mover located at an interior of said stator and being capable of oscillating with respect to said stator, said mover including:

a mover core; and a magnet mounted to an outer side of said mover core and facing said plurality of magnetic poles by a gap of sufficient space to prevent contact between said stator and said mover;

a cylinder mounted to said stator and arranged coaxial with said linear motor;

a fixed section including said stator and said cylinder;

a piston joined to said mover and accommodated in said cylinder, said piston being capable of oscillating; and a movable section including said mover and said piston.

27. The linear compressor according to claim 26, wherein said cylinder has an inner side having a substantially cylindrical shape, and wherein said piston have a substantially cylindrical shape.

28. The linear compressor according to claim 26, further comprising a spring having one end joined to said fixed section and other end joined to said movable section.

29. The linear compressor according to claim 28, wherein said spring has such a spring constant that said movable section has a resonant frequency determined according to a mass of said movable section.

30. The linear compressor according to claim 29, wherein said movable section is driven substantially at said resonant frequency.

31. The linear compressor according to claim 26, wherein said magnet includes a portion facing first and second magnetic poles of said plurality of magnetic poles adjacent to each other, and said portion of said magnet has one of an N-pole and an S-pole.

32. The linear compressor according to claim 31, wherein said magnet faces said first and second magnetic poles simultaneously during operation.

33. The linear compressor according to claim 26, wherein said magnet is mounted on said outer side of said mover core.

34. A linear motor comprising:

a hollow stator including a stator having a plurality of magnetic poles at an inner side thereof, and a wire mounted on said stator for forming said plurality of magnetic poles; and a mover located at an interior of said stator and being capable of oscillating with respect to said stator, said mover including a mover core, and a magnet mounted to an outer side of said mover core and facing said plurality of magnetic poles by a gap, wherein said wire is arranged in a ring shape of which center is an axis in an oscillating direction of said mover, wherein said stator core includes a plurality of first steel sheets arranged to radially extend from an axis in an oscillating direction of said mover, a plurality of stator core portions which sandwich said wire along said oscillating direction, and an outer stator core portion contacting respective outer sides of said stator core portions, wherein said outer stator core portion includes a plurality of second steel sheets magnetically oriented in said oscillating direction, and wherein each of said stator core portions includes a plurality of third steel sheets magnetically oriented in a direction perpendicular to said oscillating direction.

35. A linear motor comprising:

a hollow stator including a stator having a plurality of magnetic poles at an inner side thereof, and a wire mounted on said stator for forming said plurality of magnetic poles; and a mover located at an interior of said stator and being capable of oscillating with respect to said stator, said mover including a mover core, and a magnet mounted to an outer side of said mover core and facing said plurality of magnetic poles by a gap, wherein said mover core includes a core portion having a substantially cylindrical shape having an axis along said oscillating direction, a sheet-containing portion including a plurality of steel sheets arranged radially from said core portion, said sheet-containing portion having said axis of said core portion, said magnet being mounted to outward ends of said steel sheets, and wherein said core portion is hollow.

36. A linear motor comprising:

a hollow stator including a stator having a plurality of magnetic poles at an inner side thereof, and a wire mounted on said stator for forming said plurality of magnetic poles; and a mover located at an interior of said stator and being capable of oscillating with respect to said stator, said mover including a mover core, and a magnet mounted to an outer side of said mover core and facing said plurality of magnetic poles by a gap, wherein a length of said stator along said oscillating direction is substantially equal to a sum of a maximum stroke of said mover and a length of said mover along said oscillating direction.

37. A linear compressor comprising:

a linear motor comprising:

a hollow stator including a stator having a plurality of magnetic poles at an inner side thereof, and a wire mounted on said stator for forming said plurality of magnetic poles; and a mover located at an interior of said stator and being capable of oscillating with respect to said stator, said mover including a mover core, and a magnet mounted to an outer side of said mover core and facing said plurality of magnetic poles by a gap, wherein said wire is arranged in a ring shape of which center is an axis in an oscillating direction of said mover, wherein said stator core includes, a plurality of first steel sheets arranged to radially extend from an axis in an oscillating direction of said mover, a plurality of stator core portions which sandwich said wire along said oscillating direction, and an outer stator core portion contacting respective outer sides of said stator core portions, wherein said outer stator core portion includes a plurality of second steel sheets magnetically oriented in said oscillating direction, and wherein each of said stator core portions includes a plurality of third steel sheets magnetically oriented in a direction perpendicular to said oscillating direction;

a cylinder mounted to said stator and arranged coaxial with said linear motor;

a fixed section including said stator and said cylinder;

a piston joined to said mover and accommodated in said cylinder, said piston being capable of oscillating; and a movable section including said mover and said piston.

38. A linear compressor comprising:

a linear motor comprising:

a hollow stator including a stator having a plurality of magnetic poles at an inner side thereof, and a wire mounted on said stator for forming said plurality of magnetic poles; and a mover located at an interior of said stator and being capable of oscillating with respect to aid stator, said mover including a mover core, and a magnet mounted to an outer side of said mover core and facing said plurality of magnetic poles by a gap, wherein said mover core includes:

a core portion having a substantially cylindrical shape having an axis along said oscillating direction, a sheet-containing portion including a plurality of steel sheets arranged radially from said core portion, said sheet-containing portion having said axis of said core portion, said magnet being mounted to outward ends of said steel sheets, and wherein said core portion is hollow;

a cylinder mounted to said stator and arranged coaxial with said linear motor;

a fixed section including said stator and said cylinder;

a piston joined to said mover and accommodated in said cylinder, said piston being capable of oscillating; and a movable section including said mover and said piston.

39. A linear compressor comprising:

a linear motor comprising:

a hollow stator including a stator having a plurality of magnetic poles at an inner side thereof, and a wire mounted on said stator for forming said plurality of magnetic poles; and a mover located at an interior of said stator and being capable of oscillating with respect to said stator, said mover including a mover core, and a magnet mounted to an outer side of said mover core and facing said plurality of magnetic poles by a gap, wherein a length of said stator along said oscillating direction is substantially equal to a sum of a maximum stroke of said mover and a length of said mover along said oscillating direction;

a cylinder mounted to said stator and arranged coaxial with said linear motor;

a fixed section including said stator and said cylinder;

a piston joined to said mover and accommodated in said cylinder, said piston being capable of oscillating; and a movable section including said mover and said piston.

40. The linear compressor according to claim 26, wherein said magnet of said mover is operable to face said plurality of magnetic poles simultaneously.

* * * * *

UNITED STATES PATENT AND TRADEMARK OFFICE

CERTIFICATE OF CORRECTION

PATENT NO. : 6,946,754 B2

DATED : September 20, 2005

INVENTOR(S) : Ko Inagaki et al.

It is certified that error appears in the above-identified patent and that said Letters Patent is hereby corrected as shown below:

Column 8,
Line 20, change “cone” to -- core --.
Line 40, change “over” to -- mover --.
Line 44, after “direction” change “an” to -- and --.

Signed and Sealed this

Eighteenth Day of April, 2006

JON W. DUDAS
*Director of the United States Patent and Trademark Office*